US00RE35839E

United States Patent [19]

Asai et al.

[11] E Patent Number: Re. 35,839

[45] Reissued Date of Patent: Jul. 7, 1998

[54] CD-ROM DISK AND SECURITY CHECK METHOD FOR THE SAME

[75] Inventors: Toshinori Asai, Yokosuka; Masaki Kawahori, Chiba, both of Japan

[73] Assignee: Kabushiki Kaisha Sega Enterprises, Japan

[21] Appl. No.: 519,580

[22] Filed: Aug. 25, 1995

Related U.S. Patent Documents

Reissue of:

[64] Patent No.: 5,371,792
Issued: Dec. 6, 1994
Appl. No.: 171,756
Filed: Dec. 21, 1993

U.S. Applications:

[63] Continuation of Ser. No. 956,262, Oct. 5, 1992, abandoned.

[30] Foreign Application Priority Data

Jan. 31, 1992 [JP] Japan ..... 4-017006

[51] Int. Cl.[6] ..... G11B 23/28; G11B 5/09; H04L 9/00

[52] U.S. Cl. ..... 380/3; 364/DIG. 1; 364/DIG. 2; 364/245.8; 364/246.9; 364/969.4; 369/47; 380/4; 380/23; 380/25

[58] Field of Search ..... 380/3, 4, 23, 25; 364/DIG. 1, DIG. 2, 245.8, 246.9, 966.4; 369/47

[56] References Cited

U.S. PATENT DOCUMENTS

| | | | |
|---|---|---|---|
| 4,442,486 | 4/1984 | Mayer . | |
| 4,454,594 | 6/1984 | Heffron et al. . | |
| 4,462,076 | 7/1984 | Smith, III . | |
| 5,010,571 | 4/1991 | Katznelson | 380/4 |
| 5,050,213 | 9/1991 | Shear | 380/25 |
| 5,113,518 | 5/1992 | Durst, Jr. et al. | 395/550 |
| 5,133,079 | 7/1992 | Ballantyne et al. | 455/4.1 |
| 5,155,768 | 10/1992 | Matsuhara . | |

FOREIGN PATENT DOCUMENTS

| | | |
|---|---|---|
| 1183276 | 2/1985 | Canada . |
| 378385 | 7/1990 | European Pat. Off. . |
| 447043 | 9/1991 | European Pat. Off. . |
| 080244 | 8/1984 | France . |
| 58-101349 | 6/1983 | Japan . |
| 58-186843 | 10/1983 | Japan . |
| 3-266051 | 11/1991 | Japan . |
| 5-47854 | 7/1993 | Japan . |

OTHER PUBLICATIONS

Macintosh System Software 6.04, Apple Computer, Inc., 1989, p. 88.

*Primary Examiner*—Stephen C. Buczinski
*Attorney, Agent, or Firm*—Dickstein Shapiro Morin & Oshinsky LLP

[57] ABSTRACT

A CD-ROM disk comprises an identifier region having a disk identifier recorded in and a security code region having a security code recorded in. The identifier region and the security code region are provided in one sector of a boot sector to be read when actuated. The disk identifier includes a preset identification code, and the security code includes at least a program to be executed after check of the security code, and display data for displaying a license. A security check method for a CD-ROM disk comprising the steps of reading data recorded in the boot sector of the CD-ROM disk when actuated, comparing the disk identifier read from the identifier region of the boot sector with an stored identifier to check whether or not the read disk identifier is correct, comparing the security code read from the security region of the boot sector with a stored security code to check whether or not the read security code is correct, and executing the program contained in the security code when the read disk identifier and the read security code are correct, and displaying a license based on the display data.

40 Claims, 3 Drawing Sheets

CD-ROM DISK AND SECURITY CHECK METHOD FOR THE SAME

Matter enclosed in heavy brackets [ ] appears in the original patent but forms no part of this reissue specification; matter printed in italics indicates the additions made by reissue.

This application is a [continuation-in-part] *continuation* of application Ser. No. 07/956,262 filed October 5, 1992, now abandoned.

BACKGROUND OF THE INVENTION

The present invention relates to a CD-ROM using a musical purpose CD (compact disk) in a read-only storage medium, and a security check method for the same.

CDs (compact disks) have been conventionally one of media for recording sounds. But they have attracted attention as large-capacity memories for storing information other than music, such as images, data and so on, because they can digitally record [large] *larger* amounts of information than any conventional storage media.

In television game devices, a CD-ROM disk using a CD for the musical purpose records a large amount of image information, etc. in addition to a game program, and the image information recorded in the CD-ROM disk is read as video images in accordance with the progress of the game. By the use of CD-ROM disks, television games which have better picture quality and is more illustrative can be provided. Consequently game software are supplied not only in the conventional cartridges, but also in CD-ROM disks.

[It is general that] *Generally,* cartridges of game software and CD-ROMs of game software are exclusively used on specific television game devices. Each television game maker grants a license to make game software to be exclusively used on their game devices. Then it is necessary for the CD-ROM disks as well as the conventional cartridges to judge whether or not the CD-ROM disks are for their associated exclusive game devices and to display their licenses to the effect that the CD-ROMs are duly licensed and proper.

SUMMARY OF THE INVENTION

An object of the present invention is to provide a CD-ROM disk and a security checking method for the same, which can judge a kind of the disk and check whether the disk is duly licensed and proper.

The object of the present invention can be achieved by a CD-ROM disk comprising: an identifier region having a disk identifier recorded in; and a security code region having a security code recorded in, the identifier region and the security code region being provided in one sector of a boot sector to be read when actuated, the disk identifier including a preset identification code, the security code including at least a program to be executed after check of the security code, and display data for displaying a license.

The object of the present invention can be achieved by a security check method for a CD-ROM disk according to [claim 1] *the present invention,* the method comprising the steps of: reading data recorded in the boot sector of the CD-ROM disk when actuated; comparing the disk identifier read from the identifier region of the boot sector with [an] *a* stored identifier to check whether or not the read disk identifier is correct; comparing the security code read from the security region of the boot sector with a stored security code to check whether or not the read security code is correct; and executing the program contained in the security code when the read disk identifier and the read security code are correct, and displaying a license based on the display data.

According to the present invention, when actuated, data stored in a boot sector of the CD-ROM disk is read, a data identifier read from an identifier region of the boot sector is compared with a stored disk identifier to judge whether or not the read identifier is correct, a security code read from a security region of the boot sector is compared to judge whether or not the read security code is correct, and when the read disk identifier and the read security code are judged correct, a program contained in the security code is executed to display that the disk is duly licensed and proper.

DETAILED DESCRIPTION OF THE INVENTION

Figure 1:
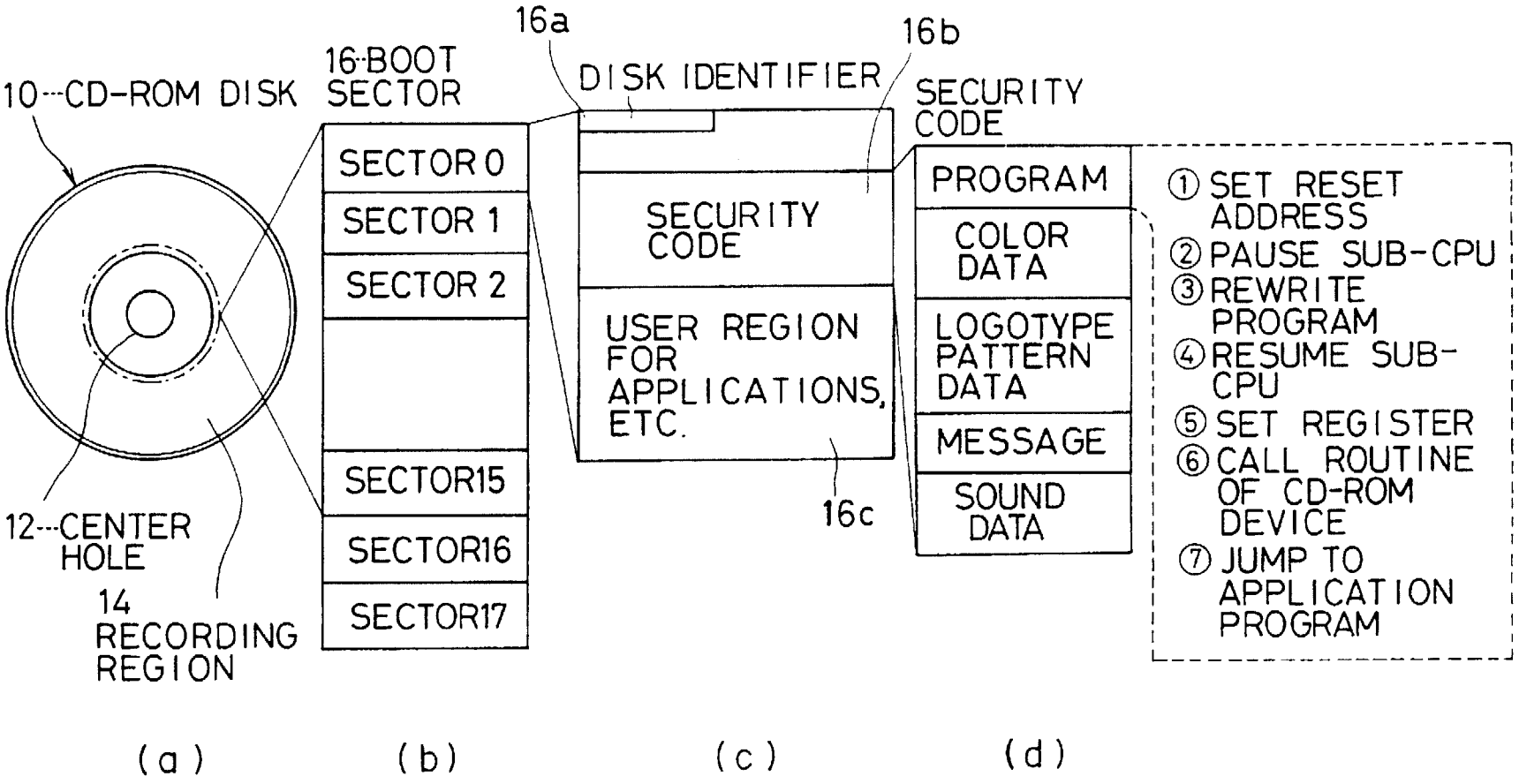
FIG. 1 is a view showing the CD-ROM disk according to one embodiment of the present invention.

The CD-ROM disk according to one embodiment of the present invention will be explained with reference to FIG. 1. FIG. 1(a) shows a plan view of the CD-ROM disk, and FIG. 1(b) to (d) show a format of the CD-ROM disk.

As shown in FIG. 1(a), the CD-ROM disk 10 according to this embodiment has a 120 mm diameter and has a 15 mm-diameter center hole 12 formed in the center of the CD-ROM disk 10. A boot sector 16 to be first read when actuated is provided on the innermost track of a recording region with ROM data and audio data recorded in.

As shown in FIG. 1(b), the boot sector has an area from Logic Sector Numbers [1] *0* to 15. A data identifier and a security code are recorded in the boot sector, i.e., in plural ones of the sectors of the boot sector in view of possible recording or read errors. Usually they are recorded in the first sector of the boot sector having Logic Sector No. 0.

The disk identifier indicates a kind of the CD-ROM disk 10, and as shown in FIG. 1(c) and is usually recorded in an identifier region 16a at the foremost part of the boot sector 16. In this embodiment, two kinds of identifiers, "SEGADISCSYSTEMSM□□" and "SEGABOOTDISC□□□□" (□ represents a space) are used. The former identifier "SEGADISCSYSTEM□□" is a disk identifier to be used in a CD-ROM disk carrying a game software which ends on the disk. The latter identifier "SEGABOOTDISC□□□□" is a disk identifier to be used in a CD-ROM disk carrying a game software which is continued on a plurality of CD-ROM disks, and is to be recorded in the first one of the CD-ROM disks carrying the game soft.

The security code indicates that the CD-ROM disk 10 is duly licensed by a television game device maker. As shown in FIG. 1(c), the security code is recorded in a security region 16b at a preset address in the boot sector 16.

As shown in FIG. 1(d), the security code contains a program to be executed after a checking operation of the security code, color data indicative of colors of LOGOTYPE to be displayed, LOGOTYPE pattern data indicative of patterns of LOGOTYPE to be displayed, message data indicative of a message "PRODUCED BY OR UNDER LICENSE FROM XXXX KABUSHIKI KAISHA), and sound data indicative of a licensor television game device maker. This embodiment is especially characterized in that a program itself to be executed following a checking operation of the security code is contained in the security code.

A program involved in this embodiment is executed by a main CPU of television game device. As shown in FIG. 1(d), the program includes seven steps.

In the first step, an address the main CPU jumps when the television game device is reset is set.

In the second step, a sub-CPU provided in the CD-ROM device for the CD-ROM disk to be mounted on is temporarily paused.

In the third step, contents of the program memory of the sub-CPU are rewritten in data recorded in the CD-ROM.

In the fourth step, the operation of the sub-CPU which has been temporarily paused is resumed.

In some television game devices, these second through fourth steps may be omitted.

In the fifth step, head addresses of data recorded in the CD-ROM disk are set in a register of the main CPU.

In the sixth step, a required program routine stored in the CD-ROM device is executed. This program routine performs a resetting operation, such as license display.

The program routine involved in this embodiment performs the following resetting operation.

First a vertical interrupt address is set. Next, a sound processor and a video processor are reset, while a video RAM is cleared, and ASCII character graphics are set. Then, based on color data stored in the security code 16b, display colors are set, and based on LOGOTYPE data in the security code 16b, LOGOTYPE character graphics are set. Subsequently message data (PRODUCED BY OR UNDER LICENSE FROM XXXX KABUSHIKI KAISHA) in the security code 16b are displayed on a television screen, and a LOGOTYPE map is set to display LOGOTYPE on the television screen. Then, after one second, based on sound data stored in the security code 16b, sounds indicative of a licensor television game device maker are outputted, and a LOGOTYPE mark color is changed, and then the television screen display is cleared.

Finally in the seventh step, a jump is performed to an application program, such as a game program.

A CD-ROM disk security check method according to one embodiment of the present invention will be explained below with reference to FIGS. 2 and 3.

Figure 2:
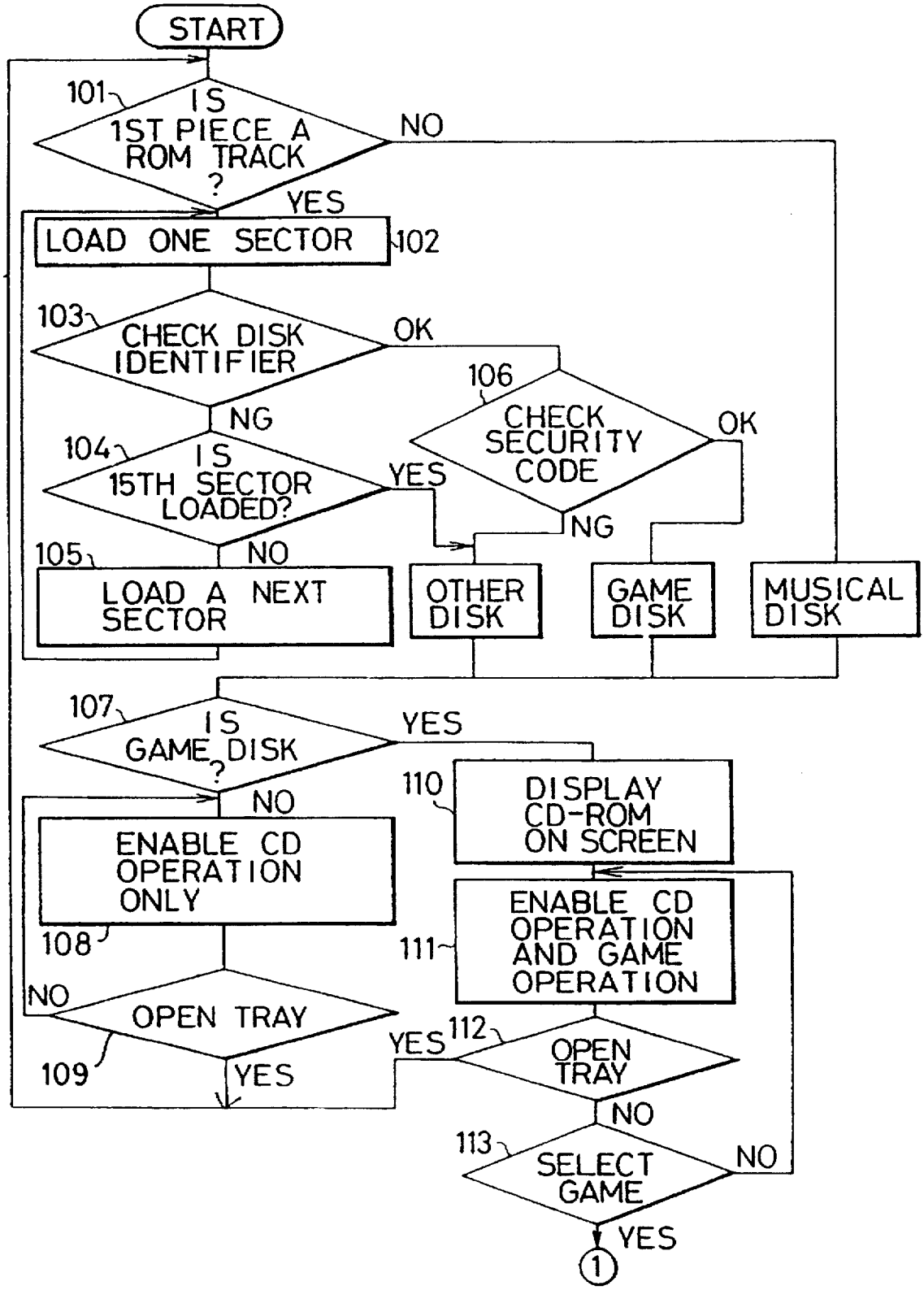
FIG. 2 is a flow chart (1) of the security check method for the CD-ROM disk according to the embodiment of the present invention.
Figure 3:
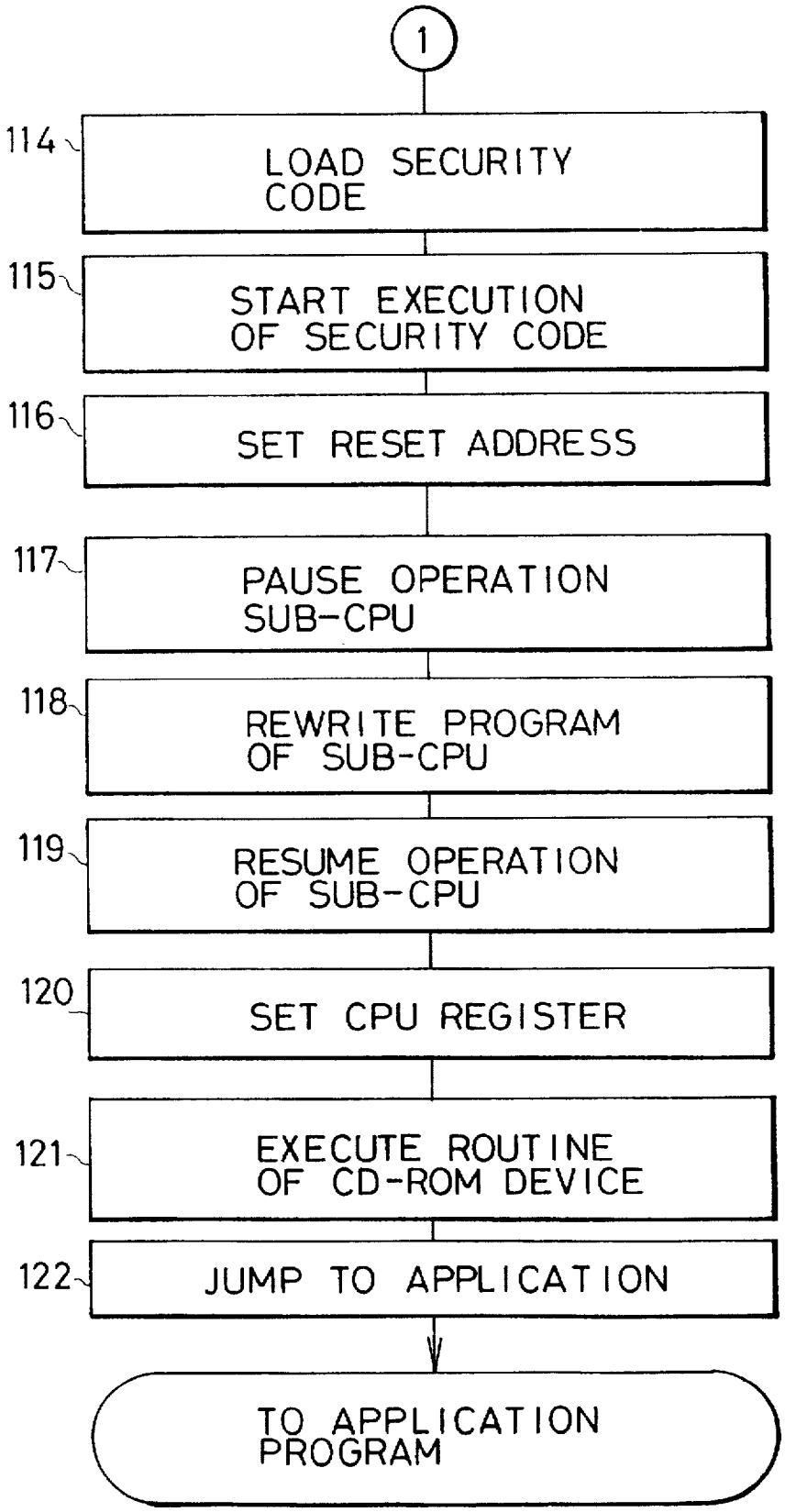
FIG. 3 is a flow chart (2) of the security check method for the CD-ROM disk according to the embodiment of the present invention.

In the flow charts of FIGS. 2 and 3, Steps 101 to 106 are for checking the security code by the sub-CPU of the CD-ROM device provided in the television game device for mounting the CD-ROM disk. Step 107 and its following steps are for operation by the main CPU provided in the television gate device.

First it is judged whether or not one piece read from the CD-ROM 10 is a ROM track (Step 101). If it is not a ROM track, it is judged a musical disk.

It if is judged a ROM track, the first sector of the boot sector 16 is loaded (Step 102). Next, a disk identifier recorded in the identifier region 16a of the boot sector 16 is compared with a disk identifier stored in the memory of the CD-ROM device (Step 103).

If it is judged that the recorded identifier does not agree with the stored identifier, it is judged whether or not all the sectors of the boot sector 16 have been loaded (Step 104). If all the sectors of the boot sector 16 have not been loaded, a next load sector is set (Step 105), and the processing is returned to Step 102. If all the sectors of the boot sector 16 have been loaded to judge that the recorded identifier does not agree with the stored identifier, the disk is judged to be a CD-ROM disk but a disk other than a game disk.

When the recorded identifier agrees with the stored identifier in Step 103, then a security code recorded in the security region 16a in the boot sector 16 is compared with the security code stored in the memory of the CD-ROM device (Step 106). If the recorded security code agrees with the stored security code, the CD-ROM disk is judged a duly licensed proper game disk. If the recorded security code does not agree with the stored security code, the disk is judged a different disk.

The processing heretofore is the operation of the sub-CPU provided in the CD-ROM device. This processing is followed by the operation by the main CPU provided in the television game device.

First, it is judged whether or not the loaded CD-ROM disk 10 is a game disk (Step 107). If the disk is not a game disk, the operation for the usual music CD [tis] *is* enabled (Step 108). Incessantly it is judged whether or not the tray of the CD-ROM device is opened (Step 109), and when it is judged that the tray is opened, there will be a possibility that the loaded CD-ROM disk 10 has been replaced, and the processing is returned to Step 101.

In Step 107, when the loaded CD-ROM disk 10 is judged a game disk, "CD-ROM" is displayed on the television screen (Step 110), and both the operation of the usual musical CD and the game operation are enabled (Step 111). It is incessantly judged whether or not the tray is opened (Step 112), and if the tray is judged opened, there is a possibility that the CD-ROM disk 10 has been replaced, and the processing is returned to Step 101.

Subsequently it is judged which has been selected between the usual musical CD operation and the game operation (Step 113). If the game operation is selected, Step 114, which will be explained below, will follow.

First, the security code is loaded from the CD-ROM disk (Step 114). Then a program contained in the security code starts to be executed (Step 115).

The first step of the program is executed, and an address for the main CPU to jump when the television game device is reset is set (Step 116).

Then, the second step of the program is executed, and the operation of the sub-CPU provided in the CD-ROM device is temporarily paused (Step 117).

Next, the third step of the program is executed, and contents of the program memory of the sub-CPU is rewritten in data recorded in the CD-ROM disk (Step 118).

Then the fourth step of the program is executed, and the sub-CPU which has been temporarily paused is resumed (Step 119).

In some television game devices, these steps 117 to 119 can be skipped.

Then the fifth step of the program is executed, and the head addresses of data recorded in the CD-ROM disk are set in a register provided in the main CPU (Step 120).

Next, the sixth step of the program is executed, and a required program routine stored in the CD-ROM device is executed (Step 121). In this program routine, resetting operation including the above-described license display, etc. is performed.

Returning from the program routine stored in the CD-ROM device, the seventh step of the program is executed to jump to an application program (Step 122), and the execution of the application program of a game or others is started, and the security check operation of the CD-ROM disk is finished.

The present invention is limited to the above-described embodiment and covers other various modifications. For example, the program contained in the security code is not limited to the program involved in the above-described embodiment and may be any kind of program.

What is claimed is:

1. A CD-ROM disk to be mounted on a CD-ROM device, said CD-ROM disk comprising an identifier region having a disk identifier recorded therein, and a security code region having a security code recorded therein, the identifier region and the security code region being provided in one sector of a boot sector to be read when actuated, the disk identifier including a preset identification code, the security code including at least a program to be executed after check of the security code.

2. A CD-ROM disk according to claim 1, wherein the program includes:

a first step in which head addresses of data recorded in the CD-ROM disk are set in a register of a first CPU; and a second step in which a required program routine stored in a CD-ROM device is executed.

3. A CD-ROM disk according to claim 1, wherein the program includes:

a first step in which a second CPU provided in the CD-ROM device is temporarily paused;

a second step in which contents of a program memory of the second CPU are rewritten with data recorded in the CD-ROM disk;

a third step in which operation of the second CPU is resumed;

a [forth] *fourth* step in which head addresses of data recorded in the CD-ROM disk are set in a register of a first CPU; and a fifth step in which a required program routine stored in the CD-ROM device is executed.

4. A CD-ROM disk according to claim 1, wherein the security code includes display data for displaying a license.

5. A CD-ROM disk according to claim 4, wherein the program includes:

a first step in which head addresses of data recorded in the CD-ROM disk are set in a register of a first CPU; and a second step in which a required program routine stored in the CD-ROM device is executed.

6. A CD-ROM disk according to claim 4, wherein the program includes:

a first step in which a second CPU provided in the CD-ROM device is temporarily paused;

a second step in which contents of a program memory of the second CPU are rewritten with data recorded in the CD-ROM disk;

a third step in which operation of the second CPU is resumed;

a [forth] *fourth* step in which head addresses of data recorded in the CD-ROM disk are set in a register of a first CPU; and a fifth step in which a required program routine stored in the CD-ROM device is executed.

7. A CD-ROM disk according to claim 4, wherein the security code includes a LOGOTYPE data indicative of LOGOTYPE to be displayed.

8. A CD-ROM disk according to claim 7, wherein the program includes:

a first step in which head addresses of data recorded in the CD-ROM disk are set in a register of a first CPU; and a second step in which a required program routine stored in a CD-ROM device is executed.

9. A CD-ROM disk according to claim 7, wherein the program includes:

a first step in which a second CPU provided in the CD-ROM device is temporarily paused;

a second step in which contents of a program memory of the second CPU are rewritten with data recorded in the CD-ROM disk;

a third step in which operation of the second CPU is resumed;

a [forth] *fourth* step in which head addresses of data recorded in the CD-ROM disk are set in a register of a first CPU; and a fifth step in which a required program routine stored in the CD-ROM device is executed.

10. A security check method for a CD-ROM disk to be mounted on a CD-ROM device, said CD-ROM disk including an identifier region having a disk identifier recorded therein and a security code region having a security code recorded therein, the identifier region and the security code region being provided in one sector of a boot sector to be read when actuated, the disk identifier including a [present] *preset* identification code, the security code including at least a program to be executed after check of the security code, the security check method comprising:

a first step of reading data recorded in a boot sector of the CD-ROM disk when actuated;

a second step of comparing the disk identifier read from the identifier region of the boot sector with a stored identifier to check whether or not the read disk identifier is correct;

a third step of comparing the security code read from the security region of the boot sector with a stored security code to check whether or not the read security code is correct; and a [forth] *fourth* step of executing the program contained in the security code when the read disk identifier and the read security code are correct.

11. A security check method according to claim 10, wherein the forth step includes:

a first step of setting addresses of data recorded in the CD-ROM disk in a register of a first CPU; and a second step of executing a required program routine stored in a CD-ROM device.

12. A security check method according to claim 10 wherein the [forth] *fourth* step includes:

a first step of temporarily pausing a second CPU provided in the CD-ROM device;

a second step of rewriting contents of a program memory of the second CPU with data recorded in the CD-ROM disk;

a third step of resuming operation of the second CPU;

a [forth] *fourth* step of setting addresses of data recorded in the CD-ROM disk in a register of a first CPU; and a fifth step of executing a required program routine stored in the CD-ROM device.

13. A security check method according to claim 10, wherein the security code includes display data for displaying a license and wherein the fourth step includes displaying a license based on the display data.

14. A security check method according to claim 13, wherein the fourth step includes:

a first step of setting addresses of data recorded in the CD-ROM disk in a register of a first CPU; and a second step of executing a required program routine stored in the CD-ROM device.

15. A security check method according to claim 13, wherein the [forth] *fourth* step includes:

a first step of temporarily pausing a second CPU provided in the CD-ROM device;

a second step of rewriting contents of a program memory of the second CPU with data recorded in the CD-ROM disk;

a third step of resuming operation of the second CPU;

a [forth] *fourth* step of setting addresses of data recorded in the CD-ROM disk in a register of a first CPU; and a fifth step of executing a required program routine stored in the CD-ROM device.

16. A security check method according to claim 13, wherein the security code includes a LOGOTYPE data indicative of LOGOTYPE to be displayed, and wherein the forth step includes a step of displaying a LOGOTYPE based on the LOGOTYPE data.

17. A security check method according to claim 16, wherein the [forth] *fourth* step includes:

a first step of setting addresses of data recorded in the CD-ROM disk in a register of a first CPU; and a second step of executing a required program routine stored in the CD-ROM device.

18. A security check method according to claim 16, wherein the [forth] *fourth* step includes:

a first step of temporarily pausing a second CPU provided in the CD-ROM device;

a second step of rewriting contents of a program memory of the second CPU with data recorded in the CD-ROM disk;

a third step of resuming operation of the second CPU;

a [forth] *fourth* step of setting addresses of data recorded in the CD-ROM disk in a register of a first CPU; and a fifth step of executing a required program routine stored in the CD-ROM device.

19. A television game device with a CD-ROM device for mounting a CD-ROM disk, said CD-ROM disk including an identifier region having an identifier recorded in and a security code region having a security code recorded in, the identifier region and the security code region being provided in one sector of a boot sector to be read when actuated, the disk identifier including a preset identification code, the security code including at least a program to be executed after check of the security code, the television game device comprising:

an executing means for reading data recorded in said boot sector of the CD-ROM disk when actuated, comparing the disk identifier read from the identifier region of the boot sector with a stored identifier to check whether or not the read disk identifier is correct, and comparing the security code read from the security region of the boot sector with a stored security code to check whether or not the read security code is correct, and for executing said program in the security code when the read disk identifier and the read security code are correct.

20. A television game device according to claim 19, wherein the security code includes display data for displaying a license, and wherein the executing means displays a license based on the display data.

21. A television game device according to claim 19, wherein the security code includes LOGOTYPE data indicative of LOGOTYPE to be displayed, and wherein the executing means displays a LOGOTYPE based on the LOGOTYPE data.

22. A television game device according to claim 19, wherein the executing means sets addresses of data recorded in the CD-ROM disk in a register, and executes a required program routine stored in the CD-ROM device.

23. A television game device according to claim 19, wherein the executing means includes a first CPU and a second CPU, and wherein the second CPU temporarily pauses the first CPU, rewrites contents of a program memory of the first CPU in data recorded in the CD-ROM disk, resumes operation of the first CPU which has been temporarily paused, sets addresses of data recorded in the CD-ROM disk in a register, and executes a required program routine stored in the CD-ROM device.

*24. A game device executing a game program loaded from an information storage medium which stores said game program and a bootstrap program, said game device comprising:*

*a memory means which stores reference data; and*

*an executing means for reading said bootstrap program from said information storage medium when said information storage medium is mounted on said game device, comparing said bootstrap program with said reference data stored in said memory means to check whether or not said bootstrap program corresponds to said reference data, and executing said bootstrap when said bootstrap program corresponds to said reference data.*

*25. A game device executing a game program loaded from an information storage medium which stores said game program and a data set including a message-displaying program and message data, said game device comprising:*

*a memory means which stores a reference data set including a reference program; and*

*an executing means for reading said data set from said information storage medium when said information storage medium is mounted on said game device, comparing said read data set with the reference data set to check at least whether or not said message-displaying program agrees with said reference program, and executing the message-displaying program to display a message corresponding to the message data when said message-displaying program agrees with said reference program.*

*26. A security check method for an information storage medium to be mounted on a game device with a security check function and reference data, said information storage medium storing a game program and a bootstrap program, comprising the steps of:*

*reading said bootstrap program from said information storage medium when said information storage medium is mounted on said game device;*

*comparing said bootstrap program with said reference data to check whether or not said bootstrap program corresponds to said reference data; and*

*executing said bootstrap program when said bootstrap program corresponds to said reference data.*

*27. A security check method for an information storage medium to be mounted on a game device with a security check function and reference data including a reference program, said information storage medium storing a game program and a bootstrap program including a data set of message-displaying program and message data, comprising the steps of:*

*reading said bootstrap program from said information storage medium when said information storage medium is mounted on said game device;*

*comparing the read data set in the bootstrap program with said reference data to check at least whether or not said message-displaying program agrees with said reference program; and*

*executing the message-displaying program to display a message corresponding to said message data when said message-displaying program agrees with said reference program.*

*28. An information storage medium for a game device with a security check function, said information storage medium having a data storage area containing a security code which includes a program to be executed by the game device after a check of the security code by the game device.*

*29. A software storage medium for use in an electronic device having means for identifying the nature of software and means for checking authenticity of the storage medium, said software storage medium comprising:*

*a main region storing software to be ready and executed by said electronic device; and*

*an initialization region to be read and executed by said electronic device for initialization of the electronic device and containing an identifier region storing an identifier code indicative of the nature of the software, and a security code region storing a security code including at least a program to be executed after completion of checking the security code by the electronic device.*

*30. An information storage medium for use in game device having means for identifying the type of the information storage medium mounted thereon and means for checking authenticity of the information storage medium, said information storage medium comprising a main region storing a game program to be executed by said electronic device and an initialization region to be read for initialization of the electronic device, said initialization region comprising:*

*an identifier region storing an identifier code indicative of the type of said information storage medium; and*

*a security code region storing a security code including message data and a message-displaying program to be executed after completion of checking the security code by the electronic device.*

*31. A game device for executing a game program loaded from an information storage medium which stores the game program and a initialization program, said game device comprising:*

*a memory means which stores reference program; and*

*an executing means for reading the initialization program from the information storage medium when said information storage medium is mounted to said game device, comparing the read initialization program with the reference program stored in said memory means to check whether or not the read initialization program includes a program which agrees with said reference program, and executing the initialization program when the read initialization program includes a program which agrees with the reference program.*

*32. An information storage medium for use with a game device, comprising a data storage area containing a game program to be executed by the game device and a security code, said security code comprising a message-displaying program to be executed by the game device for displaying a message indicating an authentic source of origin of the game program.*

*33. A game device having a security check function for executing a game program loaded from an information storage medium comprising:*

*means for reading a security code from the information storage medium when said information storage-medium is mounted on the game device, said security code including a message-displaying program for displaying a message indicating an authentic source of origin of the game program;*

*a memory means with a reference security code stored therein;*

*means for comparing said read security code including the message-displaying program with said reference security code to determine whether or not the read security code agrees with the reference security code; and*

*means for executing said message-displaying program to produce a display message indicating an originator of the game program.*

*34. A game device as in claim 33, wherein said means for executing said message display program operates to display said message after said comparing means determines that the read security code agrees with the reference security code.*

*35. A game device according to claim 33, further comprising means for enabling the game device to execute a game operation in accordance with the same program loaded from the information storage medium when said security code agrees with said reference security code.*

*36. A game device comprising:*

*an information storage medium reader to which an information storage medium with a stored game program can be mounted;*

*comparing means for comparing data read from a predetermined area of an information storage-medium with a reference security code stored in the game device to check whether or not the read data agrees with the reference security code;*

*enabling means for enabling the game device to execute a game operation in accordance with the game program read from an information storage medium when the comparing means determines that the read data agrees with the reference security code;*

*checking means for checking a status of the information storage medium reader when the game device is made ready for the game operation by the enabling means to ensure that an information storage medium remains coupled to said reader; and,*

*means for disenabling the game device from executing the game operation and for causing the information storage medium reader, the comparing means and the enabling means to initiate again the reading of data from said predetermined area of an information storage medium, the comparison of the read data with said reference security code, and the enabling of the game device to execute a game operation if the read data agrees with the reference security code, when the checking means determines that the information storage medium reader indicates that an information storage medium from which the data was initially read may have been removed from said reader.*

*37. A game device according to claim 36, wherein the security code contains a program to be executed after the comparison of the read data with said reference security code.*

*38. A game device according to claim 36, wherein the security code contains a program for displaying a message indicating an authentic source of origin of the game program.*

*39. A game device as in claim 35, wherein said information storage medium is a disk.*

*40. A game device as in claim 39, wherein said disk is a CD-disk and said checking means for checking a status of said storage medium determines whether a tray in said game device for mounting said CD-disk is opened, after said enabling means has enabled a game operation.*

* * * * *